US012434801B1

United States Patent
Wu et al.

(10) Patent No.: US 12,434,801 B1
(45) Date of Patent: Oct. 7, 2025

(54) RECONFIGURABLE UNDERWATER VEHICLE CAPABLE OF FAR-DISTANCE CRUISING AND UNDERWATER INTERACTIVE OPERATION

(71) Applicant: SOUTHEAST UNIVERSITY, Jiangsu (CN)

(72) Inventors: Jinming Wu, Jiangsu (CN); Xijie Ni, Jiangsu (CN); Zhonghua Ni, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 19/241,308

(22) Filed: Jun. 17, 2025

Related U.S. Application Data

(63) Continuation of application No. PCT/CN2024/136287, filed on Dec. 3, 2024.

(30) Foreign Application Priority Data

Mar. 4, 2024 (CN) .......................... 202410240510.X

(51) Int. Cl.
  *B63G 8/00* (2006.01)
  *B63G 8/04* (2006.01)
  *B63G 8/08* (2006.01)
(52) U.S. Cl.
  CPC .............. *B63G 8/001* (2013.01); *B63G 8/04* (2013.01); *B63G 8/08* (2013.01); *B63G 2008/002* (2013.01)
(58) Field of Classification Search
  CPC . B63G 8/001; B63G 8/02; B63G 8/04; B63G 2008/02
  See application file for complete search history.

(56) References Cited

U.S. PATENT DOCUMENTS

2008/0087762 A1* 4/2008 Holloman .............. B64U 10/30
  244/30
2023/0023286 A1* 1/2023 Evans ........................ B63B 1/30

FOREIGN PATENT DOCUMENTS

CN    104691728    6/2015
CN    205661637    10/2016
(Continued)

OTHER PUBLICATIONS

"International Search Report (Form PCT/ISA/210) of PCT/CN2024/136287", mailed on Mar. 3, 2025, with English translation thereof, pp. 1-11.

*Primary Examiner* — S. Joseph Morano
*Assistant Examiner* — Jovon E Hayes
(74) *Attorney, Agent, or Firm* — JCIP GLOBAL INC.

(57) ABSTRACT

The present disclosure provides a reconfigurable underwater vehicle capable of far-distance cruising and underwater interactive operation, which includes an operation compartment, two buoyancy compartments connected with the operation compartment by connection rods, and a folding mechanism located within the buoyancy compartments and the connection rods to drive rotation of the connection rods to switch underwater vehicle working modes. The underwater vehicle working modes include an unfolded mode and a folded mode. In the unfolded mode, the two buoyancy compartments are unfolded along a axial direction of the operation compartment to both sides of the operation compartment, and the two buoyancy compartments and the operation compartment are in series-connected state; in the folded state, the two buoyancy compartments are folded above the operation compartment at an included angle, and the two buoyancy compartments are in parallel connected state.

10 Claims, 8 Drawing Sheets

(56) References Cited

FOREIGN PATENT DOCUMENTS

| CN | 108820173 | | 11/2018 | |
|----|-----------|---|---------|---|
| CN | 109367741 | | 2/2019 | |
| CN | 116252577 A | * | 6/2023 | ............ B60F 3/0015 |
| CN | 117719636 A | * | 3/2024 | ............ B63G 8/002 |
| CN | 118083098 | | 5/2024 | |
| CN | 118083098 A | * | 5/2024 | ............. B63C 11/52 |
| CN | 119381739 B | * | 3/2025 | ......... H01R 13/5202 |
| KR | 101507422 | | 3/2015 | |

* cited by examiner

RECONFIGURABLE UNDERWATER VEHICLE CAPABLE OF FAR-DISTANCE CRUISING AND UNDERWATER INTERACTIVE OPERATION

CROSS REFERENCE TO THE RELATED APPLICATIONS

This application is a continuation of international application of PCT application serial no. PCT/CN2024/136287, filed on Dec. 3, 2024, which is based upon and claims priority to Chinese Patent Application No. 202410240510.X, filed on Mar. 4, 2024, the entire contents of which are incorporated herein by reference.

TECHNICAL FIELD

The present disclosure relates to the technical field of underwater vehicles, and in particular to a reconfigurable underwater vehicle capable of far-distance cruising and underwater interactive operation.

RELATED ART

With continuous progress of the marine development, the demands for underwater operations such as underwater ore sampling, underwater biological resource sampling, and underwater structure repairs and the like are on gradual increase. The underwater interactive operations are usually carried out by underwater vehicles. The underwater vehicles mainly include autonomous underwater vehicles (AUV) and remotely-operated vehicles (ROV). Although the conventional AUVs can autonomously navigate to carry out far-distance cruising and detection tasks by using sensors aboard, they have no capability to carry out underwater interactive operations. The conventional ROVs have the capability to carry out underwater interactive operations, but in order to have high hydrodynamic stability during operations, they have non-streamlined external appearance, leading to its inability to carry out far-distance cruising. Therefore, the ROVs are usually carried by dedicated surface ships with power positioning function to a designated sea waters for deployment and accompanied during operations while powered from the surface ships, resulting in extremely high costs. The low-cost underwater interactive operation is one of development trends of the future underwater vehicles, which requires, on the one hand, the underwater vehicles to have the far-distance cruising capability to cruise from a shore-based platform to a designated sea waters, and on the other hand, to have high hydrodynamic stability to maintain secure operation poses. In recent years, along with gradual increase of the battery energy density and gradual improvement of the autonomous capability of the underwater vehicles, there appear some trials of performing short-distance light-duty underwater operation tasks using AUV autonomy. In 2021, Kawasaki Heavy Industries successfully developed the world-first SPICE type AUV with a mechanical arm, which can carry out underwater pipe repair task autonomously. However, the SPICE is one whose mechanical arm is simply bound to the bottom side of the AUV, which, on the one hand, increases the cruising resistance which fails it to carry out long-distance cruising, on the other hand, causes it to have unstable pose in underwater interactive operations due to short distance between center of gravity and centre of buoyancy.

Therefore, it is urgent to address the above problems.

SUMMARY OF INVENTION

The object of the present disclosure: the object of the present disclosure is to provide a reconfigurable underwater vehicle capable of far-distance cruising and underwater interactive operation. With a reconfigurable structure, the underwater vehicle can adapt to double requirements of far-distance underwater cruising and underwater interactive operation at the same time, which solves the problems of the conventional autonomous underwater vehicles (AUVs) only performing detection tasks rather than underwater interactive operations and the problems of the conventional remotely-operated vehicles (ROVs) relying on the supports of those expensive dedicated surface ships with power positioning function.

Technical solution: in order to achieve the above object, the present disclosure provides a reconfigurable underwater vehicle capable of far-distance cruising and underwater interactive operation, which includes an operation compartment, two buoyancy compartments connected with the operation compartment through connection rods and a folding mechanism located within the buoyancy compartments and the connection rods to drive rotation of the connection rods to switch underwater vehicle working modes. The underwater vehicle working modes include an unfolded mode and a folded mode; in the unfolded mode, the two buoyancy compartments are unfolded along a axial direction of the operation compartment to both sides of the operation compartment, and the two buoyancy compartments and the operation compartment are in series-connected state; in the folded state, the two buoyancy compartments are folded above the operation compartment at an included angle, and the two buoyancy compartments are in parallel connected state.

The buoyancy compartments each include a buoyancy compartment housing, a buoyancy compartment housing supporting structure located within the buoyancy compartment housing, a propeller located at a fore or aft side, a propeller driving motor located within the buoyancy compartment housing to drive rotation of the propeller, and two channel thrusters symmetrically disposed on the buoyancy compartment housing along an axial direction; the buoyancy compartment housing supporting structure includes a fore supporting ring, a middle supporting ring and an aft supporting ring sequentially disposed along the buoyancy compartment.

Preferably, the operation compartment includes an operation compartment housing, an operation compartment housing supporting structure located within the operation compartment housing, an aft connection rod locking mechanism located within the operation compartment housing to lock up the connection rod, a mechanical arm connected with the operation compartment housing, a mechanical arm fairing located at a notch beneath the operation compartment housing, a mechanical arm fairing opening-closing mechanism for driving the mechanical arm fairing to open or close, and a power battery located within the operation compartment housing to provide power for the underwater vehicle.

Furthermore, the operation compartment housing supporting structure includes two operation compartment supporting rings symmetrically distributed along an axis of the operation compartment housing and opposite in direction;

each operation compartment supporting ring is provided with a fore connection rod mounting seat and an aft connection rod mounting seat.

Furthermore, the aft connection rod locking mechanism includes a locking electric push rod and a locking hook fixed on the aft connection rod mounting seat; one end of the locking hook is shaped like hook, one end of the locking hook is provided with a sliding groove and slidably connected with a mounting shaft on an output shaft of the locking electric push rod, and a middle position of the locking hook is hinged with the aft connection rod mounting seat.

Preferably, the mechanical arm fairing opening-closing mechanism includes a mounting plate located on a cross section of the operation compartment, an opening-closing driving motor on the mounting plate, a worm screw connected with an output shaft of the opening-closing driving motor, a worm gear meshed with the worm screw, a linkage rod fixedly connected with the worm gear, a sliding block sleeved on the linkage rod, a rack disposed on the linkage rod, a pinion penetrated through the sliding block and meshed with the rack, a big gear penetrated through the sliding block and meshed with the pinion, a cam disposed in coaxiality with the big gear, and a mechanical arm fairing support connected with the sliding block and slidable in a slide groove of the cam; a protruding column is disposed on both sides of the sliding block respectively, where an inner column is used for slide within a slide groove of the mounting plate, and an outer column is used as a rotary shaft of the mechanical arm fairing support to connect with the mechanical arm fairing support.

Furthermore, the connection rods include fore connection rods and aft connection rods; each of the fore connection rods includes a fore connection rod body, a fore connection rod proximal shaft, and a fore connection rod distal shaft; each of the aft connection rods includes an aft connection rod body and an aft connection rod proximal shaft; in the unfolded mode, the fore connection rods and the aft connection rods all are parallel to an axis of the underwater vehicle; the fore connection rods connect the operation compartment with two buoyancy compartments at both sides respectively, and the fore connection rods and the aft connection rods are all received in the corresponding buoyancy compartments; in the folded mode, the fore connection rods and the aft connection rods all are perpendicular to the axis of the underwater vehicle, and the fore connection rods and the aft connection rods all connect the operation compartment with the corresponding buoyancy compartments.

Furthermore, the folding mechanism includes a folding driving motor, a rope driving mechanism and a gear driving mechanism; the folding driving motor drives, through the rope driving mechanism and the gear driving mechanism, the fore connection rod proximal shaft, the fore connection rod distal shaft, and the aft connection rod proximal shaft to move.

Preferably, the rope driving mechanism includes a fore gear shaft rope driving mechanism, a fore connection rod distal shaft rope driving mechanism and an aft gear shaft rope driving mechanism, the fore gear shaft rope driving mechanism includes a folding master driving wire wheel, a fore transition wire wheel, a fore gear shaft wire wheel, and a fore gear shaft driving rope; there are two fore gear shaft driving ropes, and start ends of the fore gear shaft driving ropes are both fixed on the folding master driving wire wheel, and wound in opposite directions; two fore gear shaft driving ropes bypass the fore transition wire wheel to change a direction from axial wire distribution to radial wire distribution, and two fore gear shaft driving ropes are wound on the fore gear shaft wire wheel in opposite directions respectively, with their terminating ends fixed on the fore gear shaft wire wheel; when the folding master driving wire wheel rotates, the fore gear shaft wire wheel rotates synchronously in an opposite direction;

the fore connection rod distal shaft rope driving mechanism includes a fore gear shaft, a fore connection rod proximal transition big wire wheel, a fore connection rod proximal transition small wire wheel, a fore connection rod distal transition small wire wheel, a fore connection rod distal shaft wire wheel, and a fore connection rod distal shaft driving rope; there are two fore connection rod distal shaft driving ropes, and start ends of the fore connection rod distal shaft driving ropes are both fixed on the fore gear shaft and wound in opposite directions; two fore connection rod distal shaft driving ropes are respectively bypass the fore connection rod proximal transition big wire wheel and the fore connection rod proximal transition small wire wheel in a crossed way, and then bypass in a paralleled way the fore connection rod distal transition small wire wheel; finally, two fore connection rod distal shaft driving ropes are wound on the fore connection rod distal shaft wire wheel in opposite directions, with their terminating ends fixed on the fore connection rod distal shaft wire wheel; when the fore gear shaft rotates, the fore connection rod distal shaft wire wheel synchronously rotates in an opposite direction;

the aft gear shaft rope driving mechanism includes a folding master driving wire wheel, an aft transition wire wheel, an aft gear shaft wire wheel, and an aft gear shaft driving rope; there are two aft gear shaft driving ropes, and start ends of the aft gear shaft driving ropes are both fixed on the folding master driving wire wheel and wound in opposite directions, and then two aft gear shaft driving ropes bypass the aft transition wire wheel to change a direction from axial wire distribution to radial wire distribution; finally, two aft gear shaft driving ropes are respectively wound on the aft gear shaft wire wheel in opposite directions, with their terminating ends fixed on the aft gear shaft wire wheel; when the folding master driving wire wheel rotates, the aft gear shaft wire wheel synchronously rotates in an opposite direction.

Furthermore, the gear driving mechanism includes a fore connection rod proximal shaft gear driving mechanism and an aft connection rod proximal shaft gear driving mechanism, the fore connection rod proximal shaft gear driving mechanism includes a fore gear shaft disposed in coaxaility with the fore gear shaft wire wheel, and a fore fan-shaped gear disposed in coaxiality with the fore connection rod proximal shaft and meshed with the fore gear shaft; when the fore gear shaft wire wheel rotates, a motion through the fore gear shaft and the fore fan-shaped gear is transferred, and the fore connection rod proximal shaft synchronously rotates reversely, so as to drive the fore connection rods to rotate relative to the buoyancy compartments;

the aft connection rod proximal shaft gear driving mechanism includes an aft gear shaft disposed in coaxiality with the aft gear shaft wire wheel and an aft fan-shaped gear disposed in coaxiality with the aft connection rod proximal shaft and meshed with the aft gear shaft;

when the aft gear shaft wire wheel rotates, motion through the aft gear shaft and the aft fan-shaped gear is transferred, and the aft connection rod proximal shaft synchronously rotates reversely, so as to drive the aft connection rods to rotate relative to the buoyancy compartments.

Beneficial effects: compared with the prior arts, the present disclosure has the following obvious advantages: with the reconfigurable structure design method in the present disclosure, the underwater vehicles can adapt to double structural requirements of far-distance underwater cruising and underwater interactive operation at the same time, which solves the problems of the conventional autonomous underwater vehicles (AUVs) only performing detection tasks rather than underwater interactive operations and the problems of the conventional remotely-operated vehicles (ROVs) relying on the supports of those expensive dedicated surface ships with power positioning function, so as to make it possible to perform low-cost far-distance underwater interactive operation tasks with the underwater vehicles.

The numerals of the drawings are described below:
1. buoyancy compartment, 11. buoyancy compartment housing, buoyancy compartment housing supporting structure, 121. fore supporting ring, 122. middle supporting ring, 123. aft supporting ring, 13. propeller, 14. propeller driving motor, 15. channel thruster,
2. operation compartment, 21. operation compartment housing, 22. operation compartment housing supporting structure, 221. operation compartment supporting ring, 2211. fore connection rod mounting seat, 2212. aft connection rod mounting seat, 23. aft connection rod locking mechanism, 231. locking hook, 232. locking electric push rod, 24. mechanical arm, 25. mechanical arm fairing, 26. mechanical arm fairing opening-closing mechanism, 261. opening-closing driving motor, 262. worm-and-gear mechanism, 2621. worm screw, 2622. worm gear, 263. crank sliding block mechanism, 2631. linkage rod, 2632. sliding block, 264. rack, 265. gear reduction mechanism, 2651. pinion, 2652. big gear, 266. cam, 267. mechanical arm fairing support, 27. power battery,
3. connection rod, 31. fore connection rod, 311. fore connection rod body, 312. fore connection rod proximal shaft, 313. fore connection rod distal shaft, 32. aft connection rod, 321. aft connection rod body, 322. aft connection rod proximal shaft,
4. folding mechanism, 41. folding driving motor, 42. rope driving mechanism, 421. fore gear shaft rope driving mechanism, 4211. folding master driving wire wheel, 4212. fore transition wire wheel, 4213. fore gear shaft wire wheel, 4214. fore gear shaft driving rope, 422. fore connection rod distal shaft rope driving mechanism, 4221. fore connection rod proximal transition big wire wheel, 4222. fore connection rod proximal transition small wire wheel, 4223. fore connection rod distal transition small wire wheel, 4224. fore connection rod distal shaft wire wheel, 4225. fore connection rod distal shaft driving rope, 423. aft gear shaft rope driving mechanism, 4232. aft transition wire wheel, 4233. aft gear shaft wire wheel, 4234. aft gear shaft driving rope, 43. gear driving mechanism, 431. fore connection rod proximal shaft gear driving mechanism, 4311. fore gear shaft, 4312. fore fan-shaped gear, 432. aft connection rod proximal shaft gear driving mechanism, 4321. aft gear shaft, 4322. aft fan-shaped gear.

DESCRIPTION OF EMBODIMENTS

The technical solutions of the present disclosure will be further described in combination with the drawings.

Figure 1:
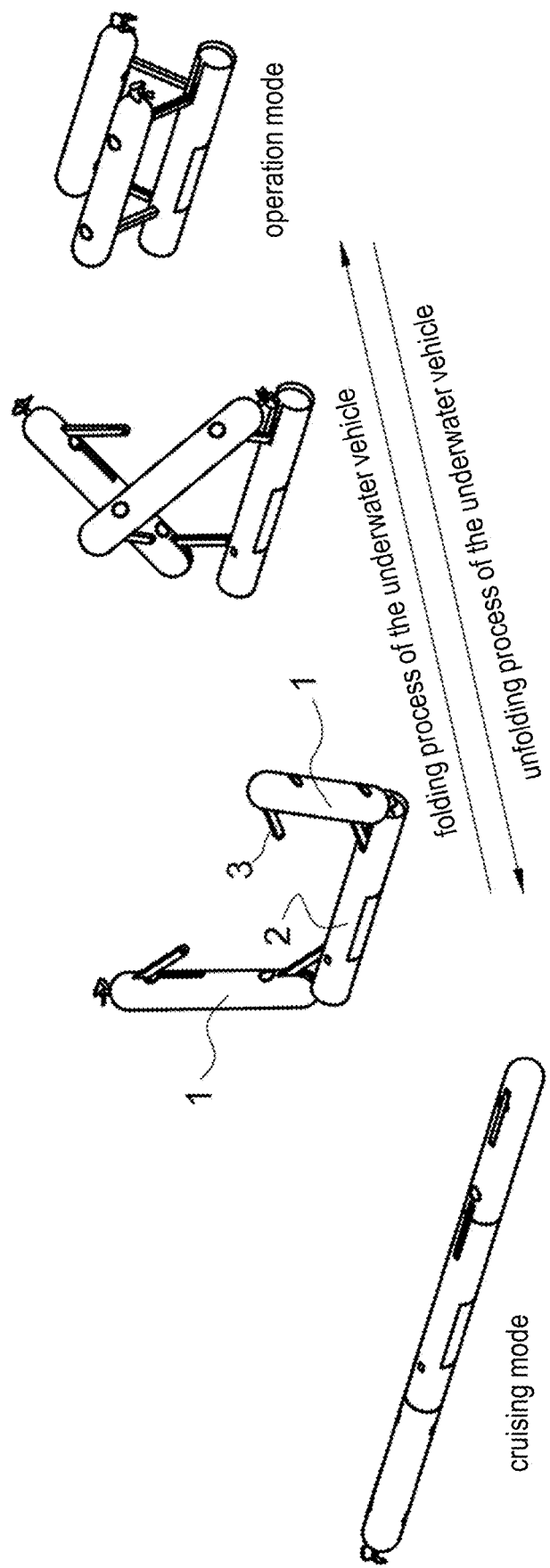
FIG. 1 is a schematic diagram illustrating a folding and unfolding process of an underwater vehicle in the present disclosure.
Figure 2:
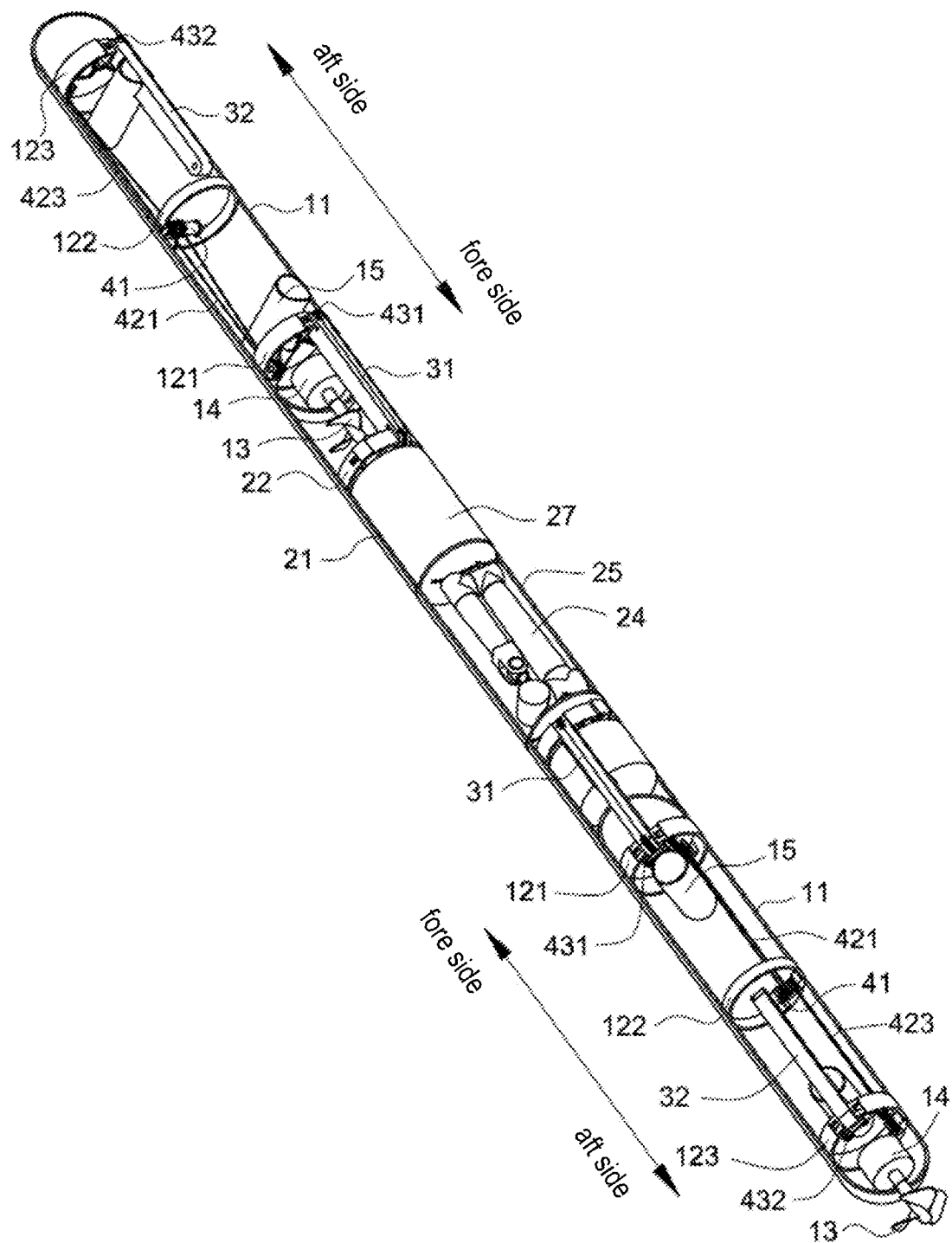
FIG. 2 is a sectional view in a cruising mode in the present disclosure.
Figure 3:
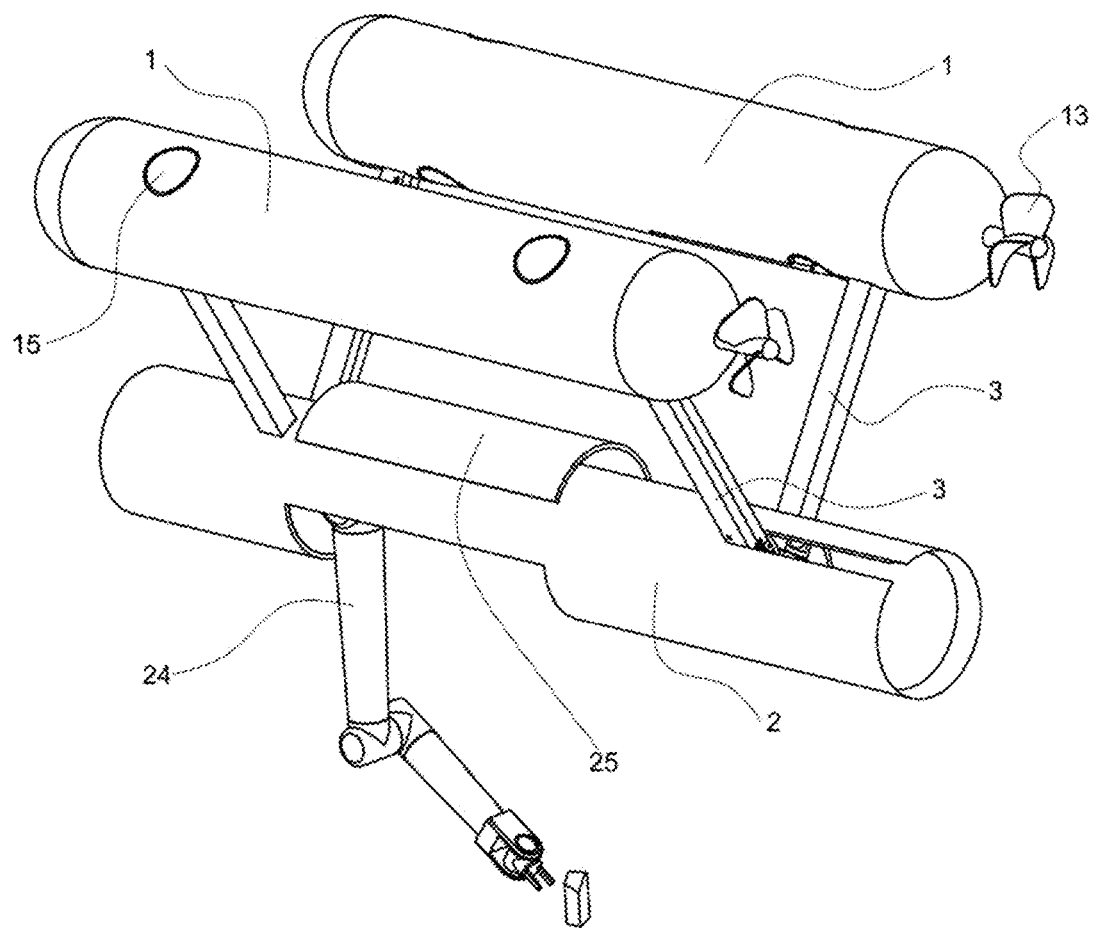
FIG. 3 is a schematic diagram in an operation mode in the present disclosure.
Figure 4:
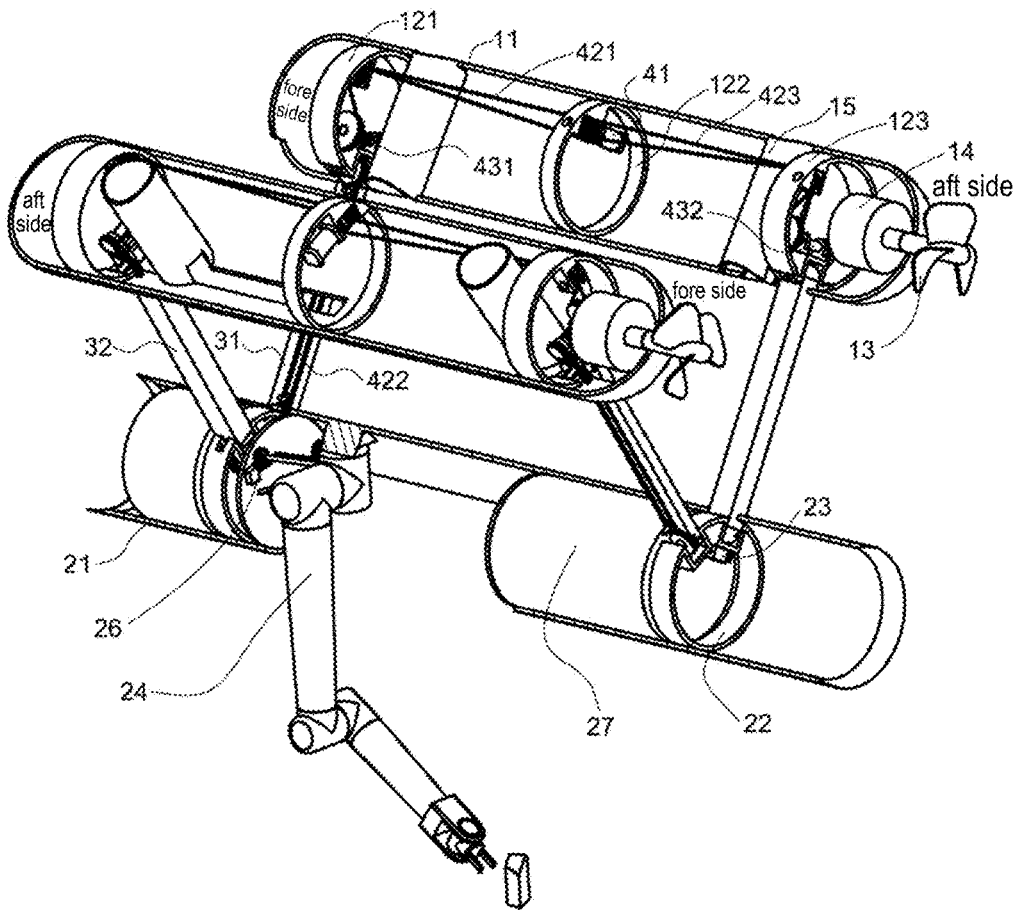
FIG. 4 is a sectional view in an operation mode in the present disclosure.

The present disclosure provides a reconfigurable underwater vehicle capable of far-distance cruising and underwater interactive operation, which includes two buoyancy compartments, an operation compartment, connection rods, and a folding mechanism. The two buoyancy compartments are connected with the operation compartment through the connection rods respectively. The underwater vehicle has two working modes, namely, a cruising mode and an operation mode, as shown in FIG. 1. As shown in FIG. 2, the cruising mode is also referred to as unfolded mode in which two buoyancy compartments of the underwater vehicle are unfolded along an axial direction of the operation compartment to both sides of the operation compartment to be in a series-connected state, forming an entire smooth streamlined and slim external contour of the underwater vehicle, and thus having a low cruising resistance and providing a structural condition for far-distance cruising of the underwater vehicle. As shown in FIGS. 3 and 4, the operation mode is also referred to as folded mode in which two buoyancy compartments of the underwater vehicle are folded above the operation compartment at an included angle to be in a parallel-connected state. Since the operation compartment holds a heavy load while the buoyancy compartments mainly provide buoyancy, a distance between the center of gravity and the center of buoyancy of the entire underwater vehicle is large, providing stable supporting platform for underwater interactive operation of a mechanical arm in the operation compartment. The two modes of the underwater vehicle can be switched by the folding mechanism in the buoyancy compartments and the connection rods.

The underwater vehicle works in the following process: at an initial working stage, the underwater vehicle is in the cruising mode and is deployed by a shore-based platform and cruises to a designated position based on a preset program, and then searches for an operation position using sensors in the underwater vehicle. After reaching the operation position, the underwater vehicle switches to the operation mode, opens a mechanical arm fairing to allow the mechanical arm to extend and perform underwater interactive operation task. After completing the operation, the mechanical arm bends and retracts into the underwater vehicle and the mechanical arm fairing is closed, and then the underwater vehicles restores to the cruising mode and cruises to the shore-based platform based on the preset program for recovery.

The present disclosure includes two buoyancy compartments 1, each of which includes a buoyancy compartment housing 11, a buoyancy compartment housing supporting structure, a propeller 13, a propeller driving motor 14 and a channel thruster 15. The two buoyancy compartments differ only in that the propellers are mounted in opposite positions: one is at a fore side and the other is at an aft side. The purpose of this disposal is that: (1) when the underwater vehicle is in the unfolded mode, the propeller of one buoyancy compartment is received into the housing contour of the underwater vehicle whereas the propeller of the other buoyancy compartment remains outside the underwater vehicle, so as to ensure the propulsion force of the propeller is along an axial direction of the underwater vehicle; (2) when the underwater vehicle is in the folded mode, the propellers are at the same side of the underwater vehicle, which ensures the symmetry of the propulsion forces of the underwater vehicle within a horizontal plane, avoiding yawing moment.

The buoyancy compartment housing 11 has streamlined external contour, helping lower the cruising resistance. Further, the buoyancy compartment housing 11 is provided with notches fitting with various connection rods so that when the underwater vehicle is in the unfolded mode, the connection rods are received into the housing contour of the underwater vehicle, avoiding increasing the resistance arising from protrusion structures on the housing of the underwater vehicle. Furthermore, the buoyancy compartment housing is provided with notches fitting with various channel thrusters for mounting the channel thrusters. The buoyancy compartment housing is fixedly connected with a buoyancy compartment housing supporting structure with high strength and rigidity to form a high-strength high-rigidity buoyancy compartment external contour.

The buoyancy compartment housing supporting structure includes a fore supporting ring 121, a middle supporting ring 122, and an aft supporting ring 123. The buoyancy compartment housing supporting structure is fixedly connected with the buoyancy compartment housing, increasing the strength and rigidity of the buoyancy compartment external contour. Further, the buoyancy compartment housing supporting structure also serves as a mounting platform for internal structural members of the buoyancy compartment. A fore connection rod proximal shaft gear driving mechanism 431 and a fore transition wire wheel 4212 are mounted on the fore supporting ring 121. A mounting hole of a folding master driving wire wheel is opened on the middle supporting ring 122. An aft connection rod proximal shaft gear driving mechanism 432 and an aft transition wire wheel 4232 are mounted on the aft supporting ring 123.

The propeller 13 is a propeller type used for common underwater vehicles, which is sleeved onto and fixedly connected with an output shaft of the propeller driving motor 14. Driven by the propeller driving motor, the propeller rotates to provide a propulsion force desired by the underwater vehicle. The propeller driving motor 14 is a direct current brushless motor type, whose output shaft is sleeved into and fixedly connected with the propeller 13, with its shell fixedly connected with the buoyancy compartment housing 11.

The channel thruster 15 is a jet pump type. Two channel thrusters 15 are symmetrically disposed along an axial direction of each buoyancy compartment 1. The axes of the two channel thrusters are parallel to each other and its angle in a plane perpendicular to the axis of the buoyancy compartment should be reasonably set such that when the underwater vehicle is in the folded or unfolded mode, an included angle between the channel thrusters in the two buoyancy compartments is close to 90 degrees, so as to efficiently provide the propulsion force perpendicular to the axial direction of the underwater vehicle, thereby realizing the maneuverability of the underwater vehicle and ensuring its sailing stability.

The operation compartment 2 includes an operation compartment housing 21, an operation compartment housing supporting structure 22, an aft connection rod locking mechanism 23, a mechanical arm 24, a mechanical arm fairing 25, a mechanical arm fairing opening-closing mechanism 26, and a power battery 27. The operation compartment housing 21 has cylindrical external contour. When the underwater vehicle is in the unfolded mode, the operation compartment is in the middle position of the underwater vehicle, and both ends of the operation compartment housing are respectively connected with two buoyancy compartment housings, such that the underwater vehicle has smooth, streamlined and slim external contour, reducing the cruising resistance of the underwater vehicle. Both ends of the operation compartment housing are cut properly with sufficient reservation space based on the fore shape of the buoyancy compartment housings, such that when the underwater vehicle is in the unfolded mode, the housings of the buoyancy compartments and the housing of the operation compartment can be seamlessly docked while the propellers mounted at the fore sides of the buoyancy compartments can be accommodated. Further, the operation compartment housing 21 is provided with notches fitting with various connection rods so that when the underwater vehicle is in the unfolded mode, the connection rods are received into the housing contour of the underwater vehicle, avoiding increasing the resistance arising from protrusion structures on the housing of the underwater vehicle. A corresponding notch is opened below the mounting position of the mechanical arm on the operation compartment housing such that the mechanical arm can extend out of the operation compartment to perform underwater interactive operation. The operation compartment housing is fixedly connected with the operation compartment housing supporting structure with high strength and rigidity to form a high-strength high-rigidity operation compartment external contour.

The operation compartment housing supporting structure 22 includes two operation compartment supporting rings 221 symmetrically distributed along the axis of the operation compartment housing and opposite in direction. Each operation compartment supporting ring 221 is provided with a fore connection rod mounting seat 2211 and an aft connection rod mounting seat 2212. A mounting hole is disposed in the fore connection rod mounting seat 2211 and is sleeved onto and fixedly connected with a fore connection rod distal shaft 313; When the fore connection rod distal shaft 313 rotates, the operation compartment 2 rotates relative to a fore connection rod 31. The aft connection rod mounting seat 2212 is used for positioning and locking of a distal end of an aft connection rod 32, and is provided with an aft connection rod locking mechanism 23 to lock up the aft connection rod 32. The fore connection rod mounting seat 2211 and the aft connection rod mounting seat 2212 are distributed circumferentially at an angle, and this angle determines the included angle of the two buoyancy compartments relative to the operation compartment when the underwater vehicle is in the folded mode. The interval angle of the fore connection rod mounting seat 2211 and the aft connection rod mounting seat 2212 should be reasonably set so that the underwater vehicle has good stability when in the folded mode.

The aft connection rod locking mechanism 23 includes a locking hook 231 and a locking electric push rod 232. The locking hook 231 is hinged to a mounting shaft in the aft connection rod mounting seat 2212 on the operation compartment supporting ring 221. One end of the locking hook is shaped like hook and the other end is provided with a slide groove slidably connected with a mounting shaft on an output shaft of the locking electric push rod 232. When the underwater vehicle starts a folding operation, the output shaft of the locking electric push rod 232 is set in a shortest state and at this time, the hook part of the locking hook 231 correspondingly rotates and separates from a motion space of the distal end of the aft connection rod, so as to enable the distal end of the aft connection rod to smoothly enter the mounting position. When the underwater vehicle completes the folding operation, the output shaft of the locking electric push rod is set in a longest state and at this time, the hook part of the locking hook 231 rotates reversely and wedges into a wedge-shaped groove of the distal end of the aft connection rod, so as to lock up the distal end of the aft connection rod 32 and ensure the structural ruggedness of the underwater vehicle in the folded mode.

The mechanical arm 24 is a waterproof and series-connected mechanical arm with multiple degrees of freedom, with its base fixedly connected with the operation compartment housing 21 and offset to a side of a vertical axial symmetric plane of the operation compartment, which not only fully uses the space in the operation compartment housing but also adjusts the entire center of mass of the mechanical arm to inside the vertical axial symmetrical plane so as to ensure the stability of the underwater vehicle. When the underwater vehicle is in the cruising mode, a joint angle of the mechanical arm is set to enable the mechanical arm to bend and retract into the underwater vehicle. When the underwater vehicle is in the operation mode, the joint angle of the mechanical arm is set to enable the mechanical arm to extend out to place an end effector of the mechanical arm outside the underwater vehicle to fetch an object.

The mechanical arm fairing 25 is mounted at the notch below the mounting position of the mechanical arm on the operation compartment housing and can be in closed or opened state with the cooperation of the mechanical arm fairing opening-closing mechanism 26. When the underwater vehicle is in the cruising mode, the mechanical arm fairing is in closed state to form a complete smooth contour of the operation compartment with the operation compartment housing, thereby reducing the cruising resistance. When the underwater vehicle is in the operation mode, the mechanical arm fairing is in opened state and covered on an upper position of the operation compartment housing such that the mechanical arm can extend out of the underwater vehicle to perform underwater interactive operation task.

Figure 5:
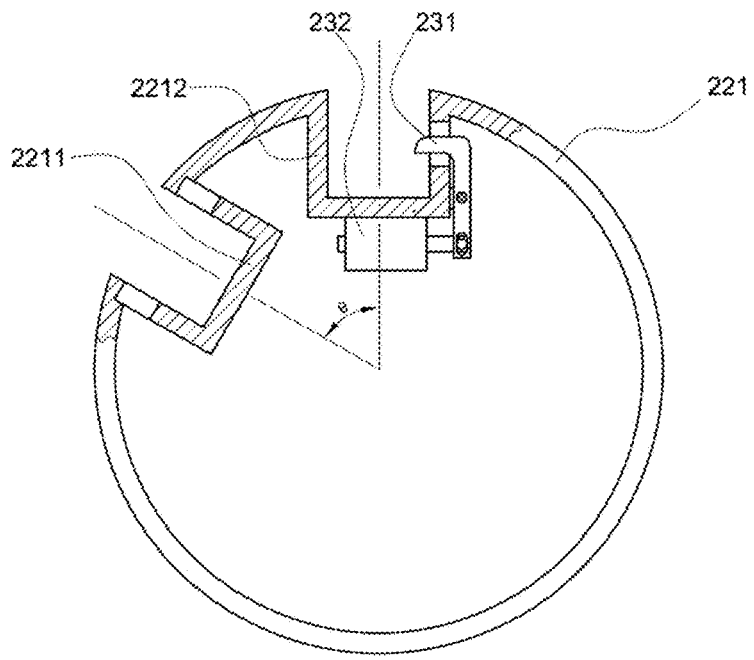
FIG. 5 is a schematic diagram illustrating an operation compartment supporting ring and an aft connection rod locking mechanism in the present disclosure.
Figure 6:
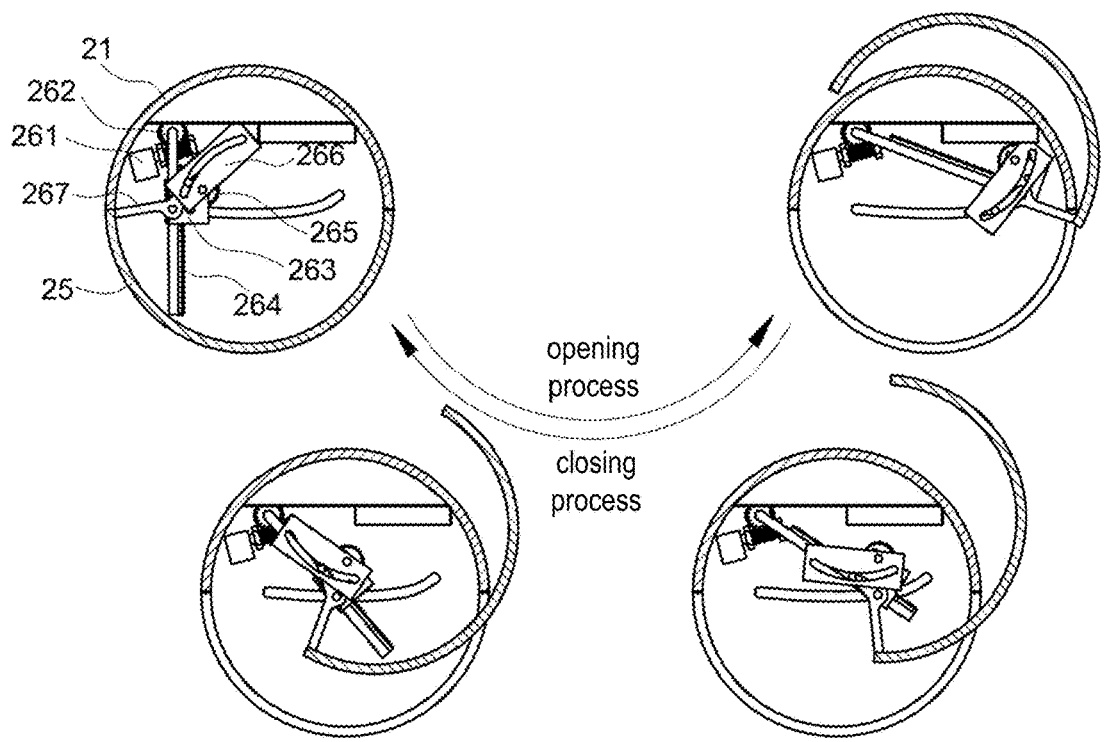
FIG. 6 is a schematic diagram of an opening-closing process of a mechanical arm fairing in the present disclosure.
Figure 7:
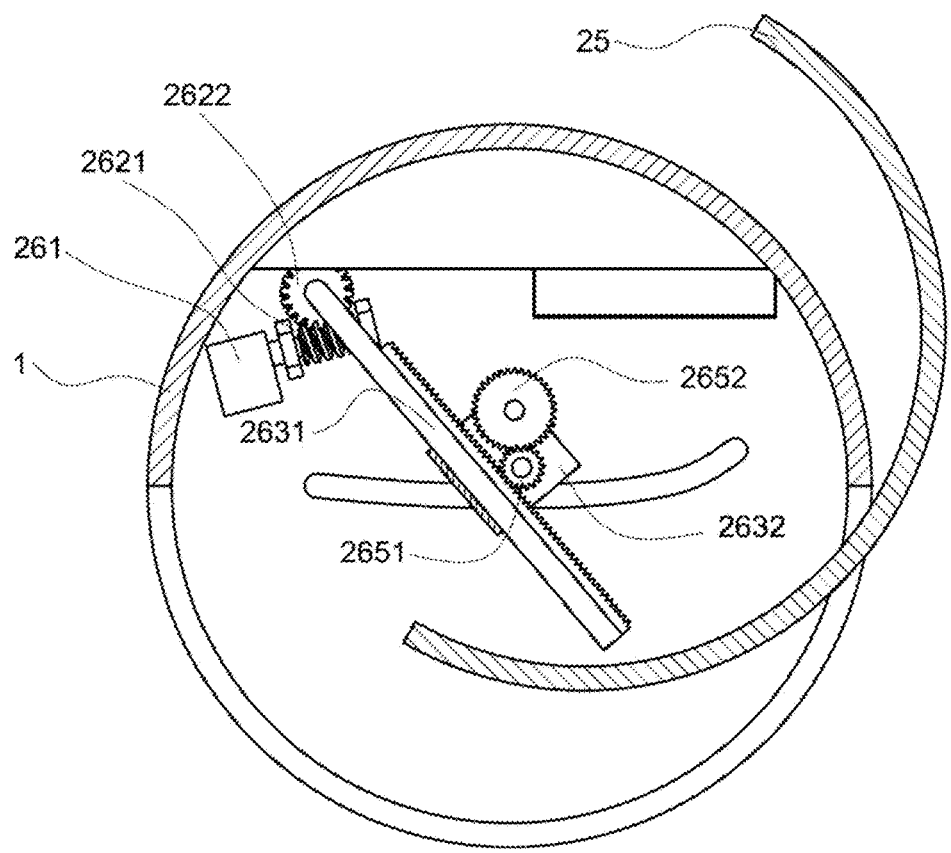
FIG. 7 is a schematic diagram of a mechanical arm fairing opening-closing mechanism in the present disclosure.
Figure 8:
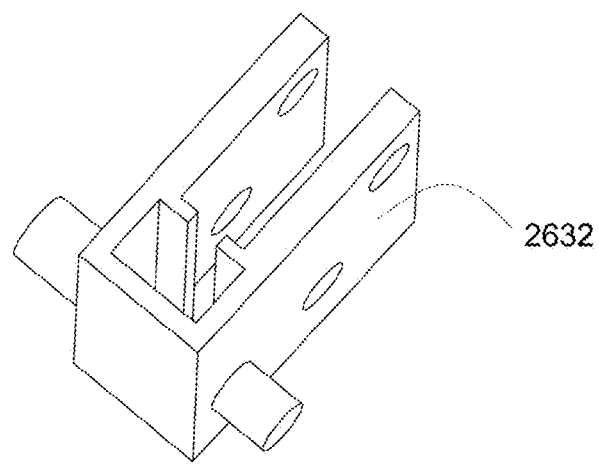
FIG. 8 is a schematic diagram of a sliding block structure in the present disclosure.

As shown in FIGS. 5, 6 and 7, the mechanical arm fairing opening-closing mechanism 26 includes an opening-closing driving motor 261, a worm-and-gear mechanism 262, a crank sliding block mechanism 263, a rack 264, a gear reduction mechanism 265, a cam 266 and a mechanical arm fairing support 267. The opening-closing driving motor 261 provides a driving force for the mechanical arm fairing opening-closing mechanism, with its output shaft sleeved and fixedly connected on a shaft of a worm screw 2621 at an input end of the worm-and-gear mechanism 262. The worm-and-gear mechanism 262 converts a high-speed rotational motion of the opening-closing driving motor 261 into a low-speed rotational motion of the worm gear 2622 and realizes motion self-locking. A linkage rod 2631 of the crank sliding block mechanism 263 is fixedly connected to the worm gear 2622 of the worm-and-gear mechanism 262 and rotates along with the worm gear 2622. A sliding block 2632 is sleeved on the linkage rod 2631 and is provided with protruding columns at both sides: an inner column is used for slide within a slide groove of the mounting plate, and an outer column is used as a rotary shaft of the mechanical arm fairing support as shown in FIG. 8. When the linkage rod 2631 rotates along with the worm gear 2622, the sliding block 2632 on the linkage rod 2631 slides together with the linkage rod 2631 along the slide groove on the mounting plate. Since the linkage rod 2631 is provided with the rack, a pinion 2651 in the gear reduction mechanism 265 mounted on the sliding block 2632 is driven by the rack to rotate to bring the cam 266 in coaxiality with the big gear 2652 to rotate. An end of the mechanical arm fairing support 267 slides in the cam 266, and thus the curved trajectory of the cam can be used to control the rotational angle of the support and further control the pose of the mechanical arm fairing, thereby avoiding physical interference with the operation compartment housing when the mechanical arm fairing is opened.

The power battery 27 is mounted inside the operation compartment housing 21 to provide power for the operation of the underwater vehicle. The power battery 27 can not only provide power for electronic devices in the operation compartment but also provide power for electronic devices in the buoyancy compartments through the fore connection rods 31. In addition, since the battery usually has high density and mass, the mounting of the battery in the operation compartment can increase the height difference of the center of buoyancy and the center of gravity of the underwater vehicle in the operation mode, so as to improve the stability of the underwater vehicle.

The connection rods 3 include fore connection rods 31 and aft connection rods 32. When the underwater vehicle is in the cruising mode, the fore connection rods 31 and the aft connection rods 32 are all parallel to the axis of the underwater vehicle. The fore connection rods 31 connect the operation compartment 2 with two buoyancy compartments 1 at both sides, and the aft connection rods 32 are received for disuse, finally forming a series-connected structure of buoyancy compartment-operation compartment-buoyancy compartment. Further, the fore connection rods 31 and the aft connection rods 32 are all received into the housing contour of the underwater vehicle, avoiding increasing the cruising resistance arising from protrusion structures on the housing of the underwater vehicle. When the underwater vehicle is in the operation mode, the fore connection rods 31 and the aft connection rods 32 are all perpendicular to the axis of the underwater vehicle. At this time, the aft connection rods 32 are firmly connected with the respective aft connection rod mounting seats 2212 in the operation compartment supporting rings 221, and the fore connection rods 31 and the aft connection rods 32 all connect the operation compartment 2 with the buoyancy compartments 1, finally forming a parallel structure of the buoyancy compartments and the operation compartment.

Each of the fore connection rods 31 includes a fore connection rod body 311, a fore connection rod proximal shaft 312, and a fore connection rod distal shaft 313. The fore connection rod body 311 is formed by fixedly connecting two symmetrical parts and a groove is disposed in the fore connection rod body 311 to facilitate the mounting of a rope driving mechanism in the fore connection rod and allow a wire to run through to realize electric connection of the buoyancy compartment and the operation compartment. Furthermore, the fore connection rods 31 retain adequate physical volume to improve the strength and rigidity of the fore connection rods. The fore connection rod proximal shaft 312 is sleeved and fixedly connected into a proximal mounting hole of the fore connection rod body and its rotation can bring the fore connection rod 31 and the buoyancy compartment 1 to synchronously rotate relative to each other. The fore connection rod distal shaft 313 is sleeved into a distal mounting hole of the fore connection rod body 311 and can rotate freely relative to the distal mounting hole. The fore connection rod distal shaft 313 is sleeved and fixedly connected with a mounting hole in the fore connection rod mounting seat 2211 on the operation compartment supporting ring 221. When the fore connection rod distal shaft 313 rotates, the fore connection rod 31 and the operation compartment 2 synchronously rotate relative to each other.

Each of the aft connection rods 32 includes an aft connection rod body 321 and an aft connection rod proximal shaft 322. The aft connection rod body 321 is a solid structure which has strong supporting capability to realize firm connection of the buoyancy 1 and the operation compartment 2. A wedge-shaped groove is disposed at a distal end of the aft connection rod body 321. When the underwater vehicle is in the operation mode, the distal end of the aft connection rod is inserted into the aft connection rod mounting seat of the operation compartment supporting ring for positioning and at the same time, the locking hook of the aft connection rod locking mechanism is wedged in for lockup. The aft connection rod proximal shaft 322 is sleeved and fixedly connected into a proximal mounting hole of the aft connection rod body and its rotation can bring the aft connection rod and the buoyancy compartment to synchronously rotate relative to each other.

The folding mechanism 4 includes a folding driving motor 41, a rope driving mechanism 42 and a gear driving mechanism 43. The object of disposing the above transmission mechanism is to drive three rotational shafts to move by simply using one folding driving motor, that is, drive the fore connection rod proximal shaft, the fore connection rod distal shaft and the aft connection rod proximal shaft to move, which can effectively reduce the number of the driving motors and increase the reliability of the system. The housing of the folding driving motor 41 is fixedly connected to the middle supporting ring 122 of the buoyancy compartment housing supporting structure, and its output shaft is sleeved into and fixedly connected with the folding master driving wire wheel 4211 in the rope driving mechanism 42 for use as power input of the folding mechanism.

Figure 9:
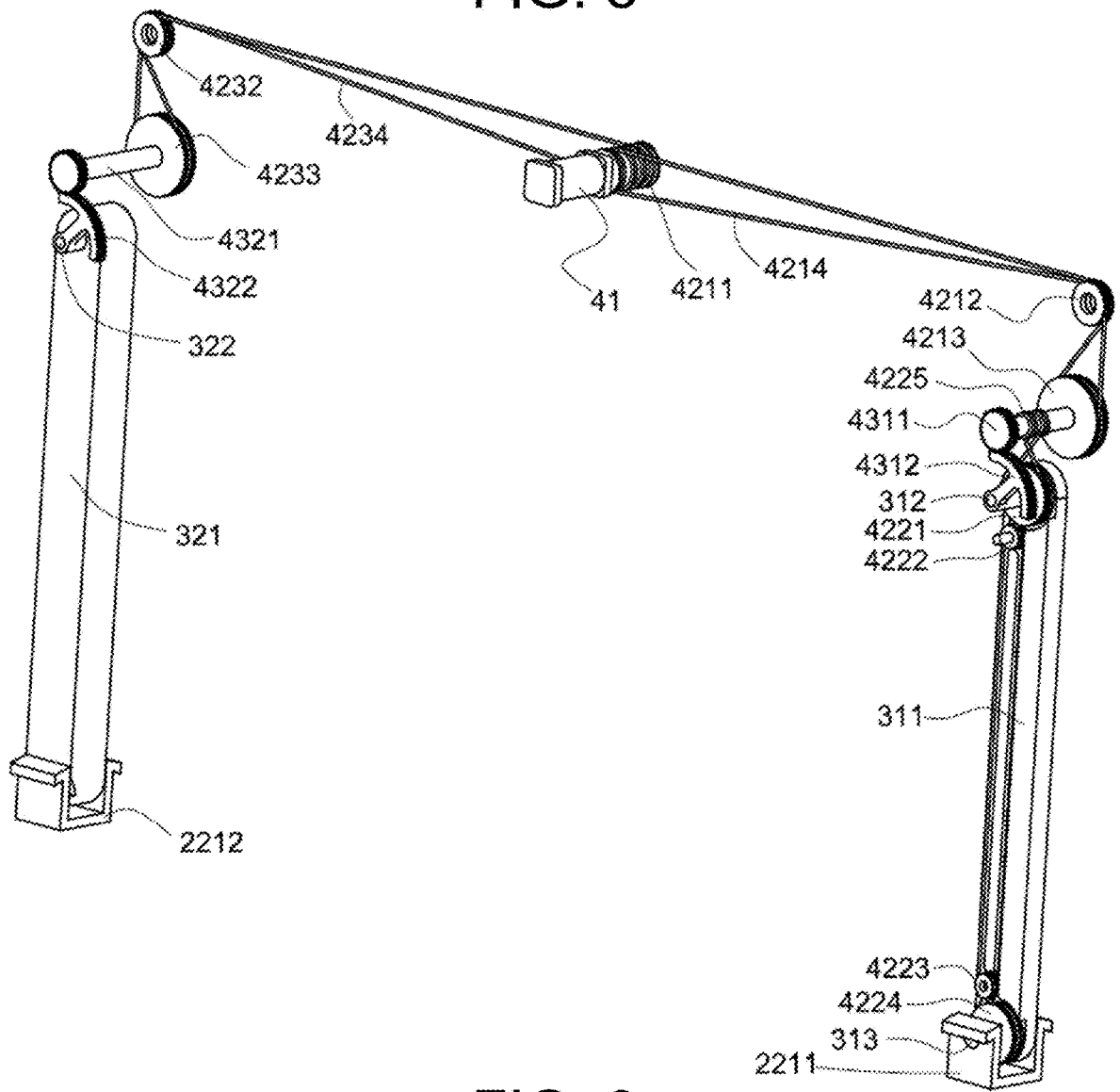
FIG. 9 is a three-dimensional schematic diagram of a rope driving mechanism in the present disclosure.
Figure 10:
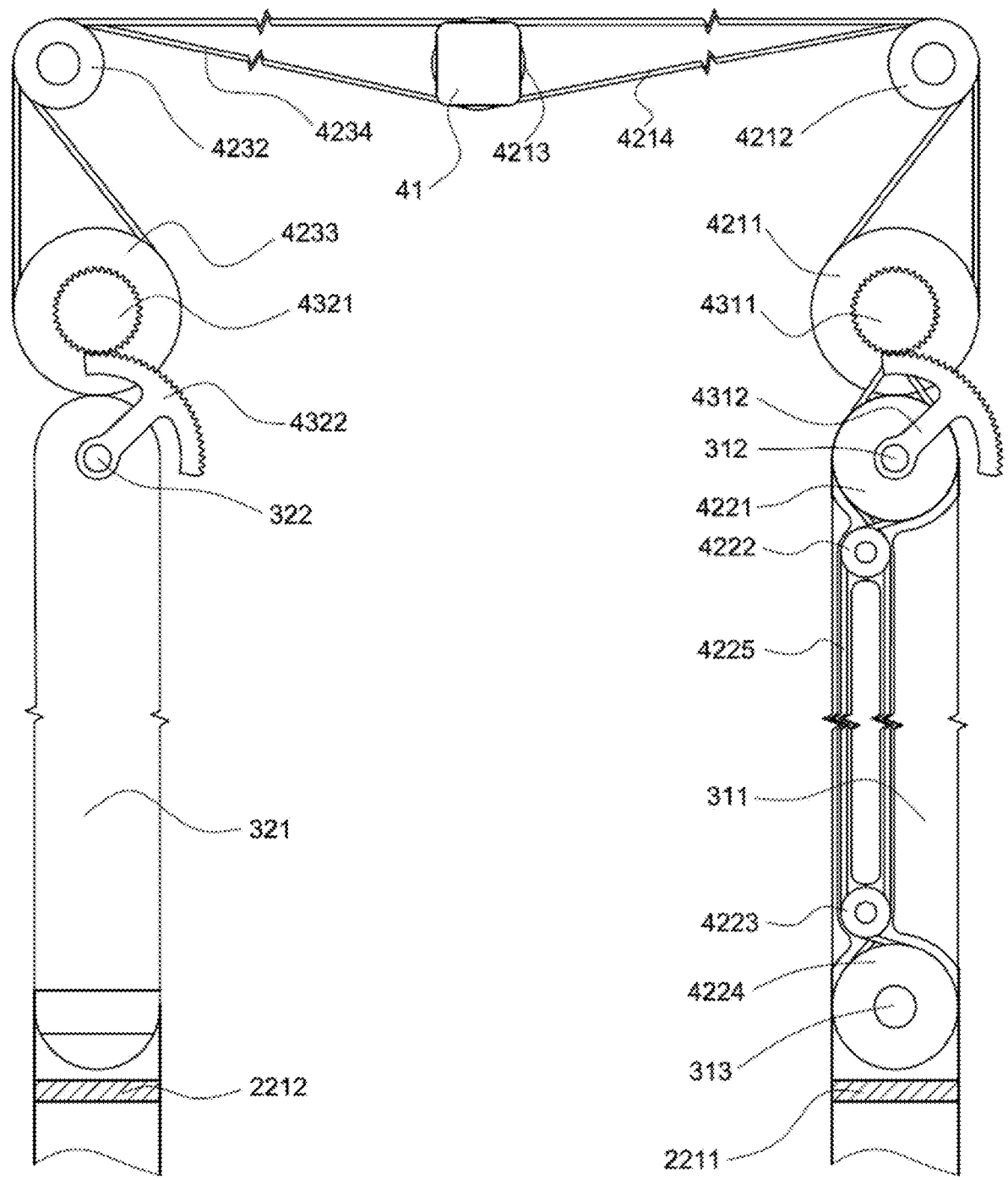
FIG. 10 is a two-dimensional schematic diagram of a rope driving mechanism in the present disclosure.
Figure 11:
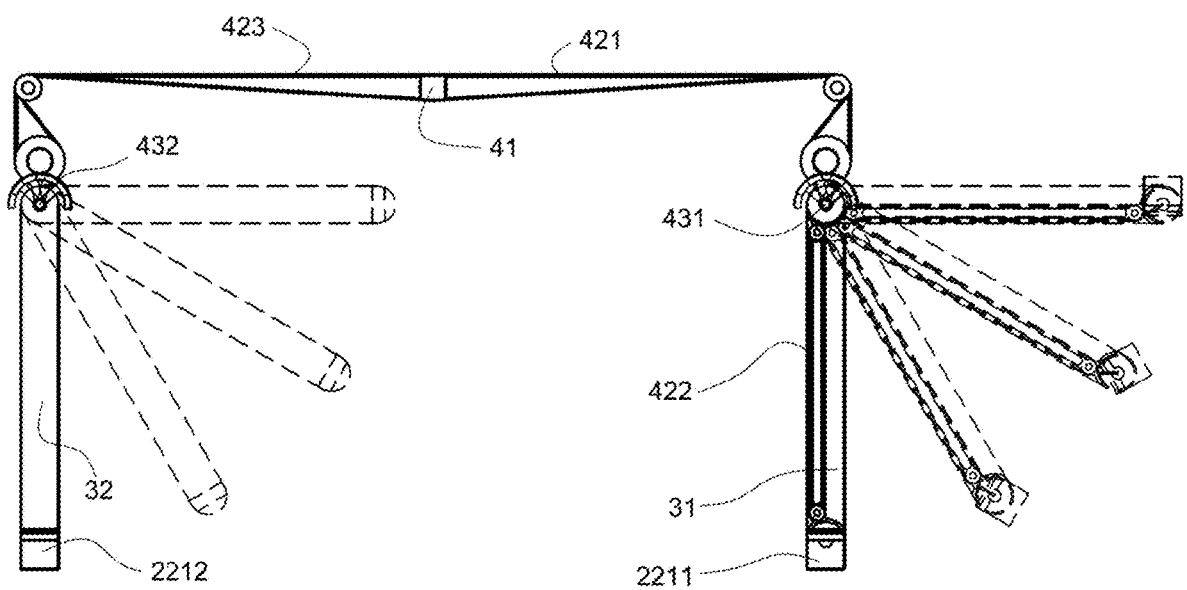
FIG. 11 is a schematic diagram of a folding and unfolding process of a rope driving mechanism in the present disclosure.

The rope driving mechanism 42 of the folding mechanism 4 includes a fore gear shaft rope driving mechanism 421, a fore connection rod distal shaft rope driving mechanism 422, and an aft gear shaft rope driving mechanism 423, as shown in FIGS. 9, 10, and 11.

The fore gear shaft rope driving mechanism 421 includes a folding master driving wire wheel 4211, a fore transition wire wheel 4212, a fore gear shaft wire wheel 4213, and a fore gear shaft driving rope 4214. There are two fore gear shaft driving ropes 4214, and their start ends are fixed on the folding master driving wire wheel 4211 and wound in opposite directions. Then, two fore gear shaft driving ropes 4214 bypass the fore transition wire wheel 4212 to change a direction from axial wire distribution to radial wire distribution. Finally, two fore gear shaft driving ropes 4214 are respectively wound on the fore gear shaft wire wheel 4213 in opposite directions, with their terminating ends fixed on the fore gear shaft wire wheel 4213. When the folding master driving wire wheel 4211 rotates, the fore gear shaft wire wheel 4213 rotates synchronously in an opposite direction. A central shaft of the folding master driving wire wheel 4211 is sleeved into a mounting hole on the middle supporting ring 121 of the buoyancy compartment housing supporting structure and can rotate freely along a centerline of the mounting hole. One end thereof is fixedly connected in sleeved way to an output shaft of the folding driving motor 41 and can rotate under the drive of the folding driving motor 41. A central hole of the fore transition wire wheel 4212 is sleeved onto a mounting shaft of the fore supporting ring 121 of the buoyancy compartment housing supporting structure and can rotate freely along a centerline of the mounting shaft. A central hole of the fore gear shaft wire wheel 4213 is sleeved onto a fore gear shaft 4311 in the fore connection rod proximal shaft gear driving mechanism 431 to drive the fore gear shaft 4311 and the fore gear shaft wire wheel 4213 to rotate synchronously. The fore gear shaft wire wheel 4213 includes two wire grooves, and two fore gear shaft driving ropes 4214 are fixed respectively to the two wire grooves and wound in opposite directions in the wire grooves.

The fore connection rod distal shaft rope driving mechanism 422 includes a fore gear shaft 4311, a fore connection rod proximal transition big wire wheel 4221, a fore connection rod proximal transition small wire wheel 4222, a fore connection rod distal transition small wire wheel 4223, a fore connection rod distal shaft wire wheel 4224, and a fore connection rod distal shaft driving rope 4225. There are two fore connection rod distal shaft driving ropes 4225, and their start ends are both fixed on the fore gear shaft 4311 and wound in opposite directions. Then, two fore connection rod distal shaft driving ropes 4225 are respectively bypass the fore connection rod proximal transition big wire wheel 4221 and the fore connection rod proximal transition small wire wheel 4222 in a crossed way and then bypass in parallel way the fore connection rod distal transition small wire wheel 4223. Finally, two fore connection rod distal shaft driving ropes 4225 are wound on the fore connection rod distal shaft wire wheel 4224 in opposite directions, with their terminating ends fixed on the fore connection rod distal shaft wire wheel 4224. When the fore gear shaft 4311 rotates, the fore connection rod distal shaft wire wheel 4224 synchronously rotate in an opposite direction. A central hole of the fore connection rod proximal transition big wire wheel 4221 is sleeved onto the fore connection rod proximal shaft 312 and can rotate freely along a centerline of the fore connection rod proximal shaft 312. The fore connection rod proximal transition small wire wheel 4222 is close to the fore connection rod proximal transition big wire wheel 4221 and its mounting hole is sleeved onto a mounting shaft in the fore connection rod body 311 and the fore connection rod proximal transition small wire wheel 4222 can rotate freely along the centerline of the mounting shaft. The fore connection rod proximal transition small wire wheel 4222 and the fore connection rod proximal transition big wire wheel 4221 have a proper relative position, such that when the fore connection rod 31 is parallel and perpendicular to the axis of the buoyancy compartment, two fore connection rod distal shaft driving ropes 4225 both are attached to the fore connection rod proximal transition small wire wheel 4222 and the fore connection rod proximal transition big wire wheel 4221. The fore connection rod distal transition small wire wheel 4223 is close to the fore connection rod distal shaft wire wheel 4224 and its mounting hole is sleeved onto a mounting shaft in the fore connection rod body 311 and the fore connection rod distal transition small wire wheel 4223 can rotate freely along the centerline of the mounting shaft. The fore connection rod proximal transition small wire wheel 4222 and the fore connection rod distal transition small wire wheel 4223 are axially arranged in parallel along a side of a main shaft of the fore connection rod. A central hole of the fore connection rod distal shaft wire wheel 4224 is sleeved and fixedly connected onto the fore connection rod distal shaft 313.

The aft gear shaft rope driving mechanism 423 includes a folding master driving wire wheel 4211, an aft transition wire wheel 4232, an aft gear shaft wire wheel 4233, and an aft gear shaft driving rope 4234. There are two aft gear shaft driving ropes 4234, and their start ends are fixed on the folding master driving wire wheel 4211 and wound in opposite directions. Then, two aft gear shaft driving ropes 4234 bypass the aft transition wire wheel 4232 to change a direction from axial wire distribution to radial wire distribution. Finally, two aft gear shaft driving ropes 4234 are respectively wound on the aft gear shaft wire wheel 4233 in opposite directions, with their terminating ends fixed on the aft gear shaft wire wheel 4233. When the folding master driving wire wheel 4211 rotates, the aft gear shaft wire wheel 4233 rotates synchronously in an opposite direction. A central hole of the aft transition wire wheel 4232 is sleeved onto a mounting shaft on the aft supporting ring of the buoyancy compartment housing supporting structure, and the aft transition wire wheel 4232 can rotate freely along the centerline of the mounting shaft. A central hole of the aft gear shaft wire wheel 4233 is sleeved onto an aft gear shaft 4321 in the aft connection rod proximal shaft gear driving mechanism 432 to drive the aft gear shaft 4321 and the aft gear shaft wire wheel 4233 to rotate synchronously. The aft gear shaft wire wheel 4233 includes two wire grooves and two aft gear shaft driving ropes 4234 are fixed respectively to the two wire grooves and wound in opposite directions in the wire grooves.

The transition wire wheels in the rope driving mechanism 42 of the folding mechanism 4 include the fore transition wire wheel 4212, the fore connection rod proximal transition big wire wheel 4221, the fore connection rod proximal transition small wire wheel 4222, the fore connection rod distal transition small wire wheel 4223 and the aft transition wire wheel 4232, each of which includes two independent freely-rotating wire wheels which are always opposite in rotation direction.

The gear driving mechanism 43 includes the fore connection rod proximal shaft gear driving mechanism 431 and the aft connection rod proximal shaft gear driving mechanism 432.

The fore connection rod proximal shaft gear driving mechanism 431 includes the fore gear shaft 4311, a fore fan-shaped gear 4312, and the fore connection rod proximal shaft 312. The fore gear shaft 4311 and the fore connection rod proximal shaft 312 are both sleeved into a mounting hole on the fore supporting ring 121 in the buoyancy compartment housing supporting structure and can freely rotate along the centerline of the mounting hole. Furthermore, the fore gear shaft 4311 is sleeved into and fixedly connected to the fore gear shaft wire wheel 4213 in the fore gear shaft rope driving mechanism 421. The fore fan-shaped gear 4312 is meshed with gear teeth of the fore gear shaft 4311 and its mounting hole is sleeved onto and fixedly connected to the fore connection rod proximal shaft 312. Therefore, when the fore gear shaft wire wheel 4213 rotates, motion through the fore gear shaft 4311 and the fore fan-shaped gear 4312 is transferred and the fore connection rod proximal shaft 312 synchronously rotates reversely so as to drive the fore connection rod 31 to rotate relative to the buoyancy compartment 1.

The aft connection rod proximal shaft gear driving mechanism 432 includes the aft gear shaft 4321, an aft fan-shaped gear 4322 and the aft connection rod proximal shaft 322. The aft gear shaft 4321 and the aft connection rod proximal shaft 322 are both sleeved into a mounting hole of the aft supporting ring 123 in the buoyancy compartment housing supporting structure, and can freely rotate along a centerline of the mounting hole. Further, the aft gear shaft 4321 is sleeved into and fixedly connected to the aft gear shaft wire wheel 4233 in the aft gear shaft rope driving mechanism 423. The aft fan-shaped gear 4322 is meshed with gear teeth of the aft gear shaft 4321, and a mounting hole thereon is sleeved and fixedly connected onto the aft connection rod proximal shaft 322. Therefore, when the aft gear shaft wire wheel 4233 rotates, motion through the aft gear shaft 4321 and the aft fan-shaped gear 4322 is transferred and the aft connection rod proximal shaft 322 rotates synchronously in an opposite direction, so as to drive the aft connection rod 32 to rotate relative to the buoyancy compartment 1.

The fore connection rod proximal shaft 312 and the aft connection rod proximal shaft 322 are both close to the buoyancy compartment housing 11 and rotate within 90 degrees, and the fore fan-shaped gear 4312 and the aft fan-shaped gear 4322 respectively meshed with the gear teeth of the fore gear shaft 4311 and the aft gear shaft 4321 both are fan-shaped structures rather than complete-circle structures, aiming to avoid physical interference.

The working principle of the folding mechanism is described below.

Taking the folding driving motor 41 rotating clockwise (see the output shaft from the back of the folding driving motor) as example, when the folding driving motor 41 rotates clockwise, the fore gear shaft wire wheel 4213 rotates counterclockwise to bring the fore gear shaft 4311 to rotate counterclockwise, and the rotation direction is reversed through the fore fan-shaped gear 4312 to enable the fore connection rod proximal shaft 312 to rotate clockwise. Further, since the fore gear shaft 4311 rotates counterclockwise, the fore connection rod distal shaft driving rope 4225, through a transfer process of multiple intermediate transition wire wheels, drives the fore connection rod distal shaft 313 to rotate clockwise. Furthermore, since the folding driving motor 41 rotates clockwise, the aft gear shaft wire wheel 4213 rotates counterclockwise to bring the aft gear shaft 4321 to rotate counterclockwise, and the rotation direction is reversed by the aft fan-shaped gear 4322 to enable the aft connection rod proximal shaft 322 to rotate clockwise. With the joint action of the rope driving mechanism 42 and the gear driving mechanism 43 of the folding mechanism 4, the fore connection rod proximal shaft 312, the fore connection rod distal shaft 313 and the aft connection rod proximal shaft 322 all rotate in the same direction as the folding driving motor 41. By reasonably setting gear transmission ratio and wire wheel transmission ratio, the fore connection rod proximal shaft 312, the fore connection rod distal shaft 313 and the aft connection rod proximal shaft 322 are consistent in rotation speed and rotation angle.

The underwater vehicle in the present disclosure has its entire center of mass and center of buoyancy constantly changing in position during the folding and unfolding process. In order to enable the underwater vehicle to maintain stable pose in the folding and unfolding process, it is required to carry out control on the folding and unfolding process of the underwater vehicle. When the underwater vehicle folds, since the operation compartment accommodates heavy load while the buoyancy compartments mainly provide buoyancy, the operation compartment moves downward spontaneously while the buoyancy compartments move upward spontaneously, such that the folding process tends to be completed spontaneously, which may cause the underwater vehicle to lose its stable state due to excessively quick movement. Therefore, it is required to apply a resistance moment by the folding driving motor during the folding process to prevent excessively quick folding. When the underwater vehicle unfolds, it is required to further sink the buoyancy compartments with buoyancy greater than gravity and further float up the operation compartment with gravity greater than buoyancy, which may consume an amount of energy. The power device driving the unfolding process includes the folding driving motor and the channel thruster and it is required to reasonably control an output force and moment of the folding driving motor and the channel thruster, minimizing the energy consumed for the unfolding process. Furthermore, in the folding and unfolding process of the underwater vehicle, the action force of the uncertain water flows may pose influence on the stability of the underwater vehicle. Therefore, it is necessary to consider the influence of the disturbance terms of the water action force in the controller design process.

What is claimed is:

1. A reconfigurable underwater vehicle capable of far-distance cruising and underwater interactive operation, comprising: an operation compartment, two buoyancy compartments connected with the operation compartment through connection rods and a folding mechanism located within the buoyancy compartments and the connection rods to drive rotation of the connection rods to switch underwater vehicle working modes, wherein the underwater vehicle working modes comprise an unfolded mode and a folded mode; in the unfolded mode, the two buoyancy compartments are unfolded along a axial direction of the operation compartment to both sides of the operation compartment, and the two buoyancy compartments and the operation compartment are in series-connected state; in the folded state, the two buoyancy compartments are folded above the operation compartment at an included angle, and the two buoyancy compartments are in parallel connected state.

2. The reconfigurable underwater vehicle capable of far-distance cruising and underwater interactive operation according to claim 1, wherein the buoyancy compartments each comprise a buoyancy compartment housing, a buoyancy compartment housing supporting structure located within the buoyancy compartment housing, a propeller located at a fore or aft side, a propeller driving motor located within the buoyancy compartment housing to drive rotation of the propeller, and two channel thrusters symmetrically disposed on the buoyancy compartment housing along an axial direction; the buoyancy compartment housing supporting structure comprises a fore supporting ring, a middle supporting ring and an aft supporting ring sequentially disposed along the buoyancy compartment.

3. The reconfigurable underwater vehicle capable of far-distance cruising and underwater interactive operation according to claim 1, wherein the operation compartment comprises an operation compartment housing, an operation compartment housing supporting structure located within the operation compartment housing, an aft connection rod locking mechanism located within the operation compartment housing to lock up the connection rod, a mechanical arm connected with the operation compartment housing, a mechanical arm fairing located at a notch beneath the operation compartment housing, a mechanical arm fairing opening-closing mechanism for driving the mechanical arm fairing to open or close, and a power battery located within the operation compartment housing to provide power for the underwater vehicle.

4. The reconfigurable underwater vehicle capable of far-distance cruising and underwater interactive operation according to claim 3, wherein the operation compartment housing supporting structure comprises two operation compartment supporting rings symmetrically distributed along an axis of the operation compartment housing and opposite in direction; each operation compartment supporting ring is provided with a fore connection rod mounting seat and an aft connection rod mounting seat.

5. The reconfigurable underwater vehicle capable of far-distance cruising and underwater interactive operation according to claim 4, wherein the aft connection rod locking mechanism comprises a locking electric push rod and a locking hook fixed on the aft connection rod mounting seat; one end of the locking hook is shaped like hook, one end of the locking hook is provided with a sliding groove and slidably connected with a mounting shaft on an output shaft of the locking electric push rod, and a middle position of the locking hook is hinged with the aft connection rod mounting seat.

6. The reconfigurable underwater vehicle capable of far-distance cruising and underwater interactive operation according to claim 3, wherein the mechanical arm fairing opening-closing mechanism comprises a mounting plate located on a cross section of the operation compartment, an opening-closing driving motor on the mounting plate, a worm screw connected with an output shaft of the opening-closing driving motor, a worm gear meshed with the worm screw, a linkage rod fixedly connected with the worm gear, a sliding block sleeved on the linkage rod, a rack disposed on the linkage rod, a pinion penetrated through the sliding block and meshed with the rack, a big gear penetrated through the sliding block and meshed with the pinion, a cam disposed in coaxialty with the big gear, and a mechanical arm fairing support connected with the sliding block and slidable in a slide groove of the cam; a protruding column is disposed on both sides of the sliding block respectively, wherein an inner column is used for slide within a slide groove of the mounting plate, and an outer column is used as a rotary shaft of the mechanical arm fairing support to connect with the mechanical arm fairing support.

7. The reconfigurable underwater vehicle capable of far-distance cruising and underwater interactive operation according to claim 1, wherein the connection rods comprise fore connection rods and aft connection rods; each of the fore connection rods comprises a fore connection rod body, a fore connection rod proximal shaft, and a fore connection rod distal shaft; each of the aft connection rods comprises an aft connection rod body and an aft connection rod proximal shaft; in the unfolded mode, the fore connection rods and the aft connection rods all are parallel to an axis of the underwater vehicle; the fore connection rods connect the operation compartment with two buoyancy compartments at both sides respectively, and the fore connection rods and the aft connection rods are all received in the corresponding buoyancy compartments; in the folded mode, the fore connection rods and the aft connection rods all are perpendicular to the axis of the underwater vehicle, and the fore connection rods and the aft connection rods all connect the operation compartment with the corresponding buoyancy compartments.

8. The reconfigurable underwater vehicle capable of far-distance cruising and underwater interactive operation according to claim 7, wherein the folding mechanism comprises a folding driving motor, a rope driving mechanism and a gear driving mechanism; the folding driving motor drives, through the rope driving mechanism and the gear driving mechanism, the fore connection rod proximal shaft, the fore connection rod distal shaft, and the aft connection rod proximal shaft to move.

9. The reconfigurable underwater vehicle capable of far-distance cruising and underwater interactive operation according to claim 8, wherein the rope driving mechanism comprises a fore gear shaft rope driving mechanism, a fore connection rod distal shaft rope driving mechanism and an aft gear shaft rope driving mechanism, the fore gear shaft rope driving mechanism comprises a folding master driving wire wheel, a fore transition wire wheel, a fore gear shaft wire wheel, and a fore gear shaft driving rope; there are two fore gear shaft driving ropes, and start ends of the fore gear shaft driving ropes are both fixed on the folding master driving wire wheel, and wound in opposite directions; two fore gear shaft driving ropes bypass the fore transition wire wheel to change a direction from axial wire distribution to radial wire distribution, and two fore gear shaft driving ropes are wound on the fore gear shaft wire wheel in opposite directions respectively, with their terminating ends fixed on the fore gear shaft wire wheel; when the folding master driving wire wheel rotates, the fore gear shaft wire wheel rotates synchronously in an opposite direction;

the fore connection rod distal shaft rope driving mechanism comprises a fore gear shaft, a fore connection rod proximal transition big wire wheel, a fore connection rod proximal transition small wire wheel, a fore connection rod distal transition small wire wheel, a fore connection rod distal shaft wire wheel, and a fore connection rod distal shaft driving rope; there are two fore connection rod distal shaft driving ropes, and start ends of the fore connection rod distal shaft driving ropes are both fixed on the fore gear shaft and wound in opposite directions; two fore connection rod distal shaft driving ropes are respectively bypass the fore connection rod proximal transition big wire wheel and the fore connection rod proximal transition small wire wheel in a crossed way, and then bypass in a paralleled way the fore connection rod distal transition small wire wheel; finally, two fore connection rod distal shaft driving ropes are wound on the fore connection rod distal shaft wire wheel in opposite directions, with their terminating ends fixed on the fore connection rod distal shaft wire wheel; when the fore gear shaft rotates, the fore connection rod distal shaft wire wheel synchronously rotates in an opposite direction;

the aft gear shaft rope driving mechanism comprises a folding master driving wire wheel, an aft transition wire wheel, an aft gear shaft wire wheel, and an aft gear shaft driving rope; there are two aft gear shaft driving ropes, and start ends of the aft gear shaft driving ropes are both fixed on the folding master driving wire wheel and wound in opposite directions, and then two aft gear shaft driving ropes bypass the aft transition wire wheel to change a direction from axial wire distribution to radial wire distribution; finally, two aft gear shaft driving ropes are respectively wound on the aft gear shaft wire wheel in opposite directions, with their terminating ends fixed on the aft gear shaft wire wheel; when the folding master driving wire wheel rotates, the aft gear shaft wire wheel synchronously rotates in an opposite direction.

10. The reconfigurable underwater vehicle capable of far-distance cruising and underwater interactive operation according to claim 9, wherein the the gear driving mechanism comprises a fore connection rod proximal shaft gear driving mechanism and an aft connection rod proximal shaft gear driving mechanism, the fore connection rod proximal shaft gear driving mechanism comprises a fore gear shaft disposed in coaxaility with the fore gear shaft wire wheel, and a fore fan-shaped gear disposed in coaxiality with the fore connection rod proximal shaft and meshed with the fore gear shaft; when the fore gear shaft wire wheel rotates, a motion through the fore gear shaft and the fore fan-shaped gear is transferred, and the fore connection rod proximal shaft synchronously rotates reversely, so as to drive the fore connection rods to rotate relative to the buoyancy compartments;

the aft connection rod proximal shaft gear driving mechanism comprises an aft gear shaft disposed in coaxiality with the aft gear shaft wire wheel and an aft fan-shaped gear disposed in coaxiality with the aft connection rod proximal shaft and meshed with the aft gear shaft; when the aft gear shaft wire wheel rotates, motion through the aft gear shaft and the aft fan-shaped gear is transferred, and the aft connection rod proximal shaft synchronously rotates reversely, so as to drive the aft connection rods to rotate relative to the buoyancy compartments.

* * * * *